(No Model.) 2 Sheets—Sheet 1.
C. GUYER.
SHINGLE MARKER.
No. 532,661. Patented Jan. 15, 1895.
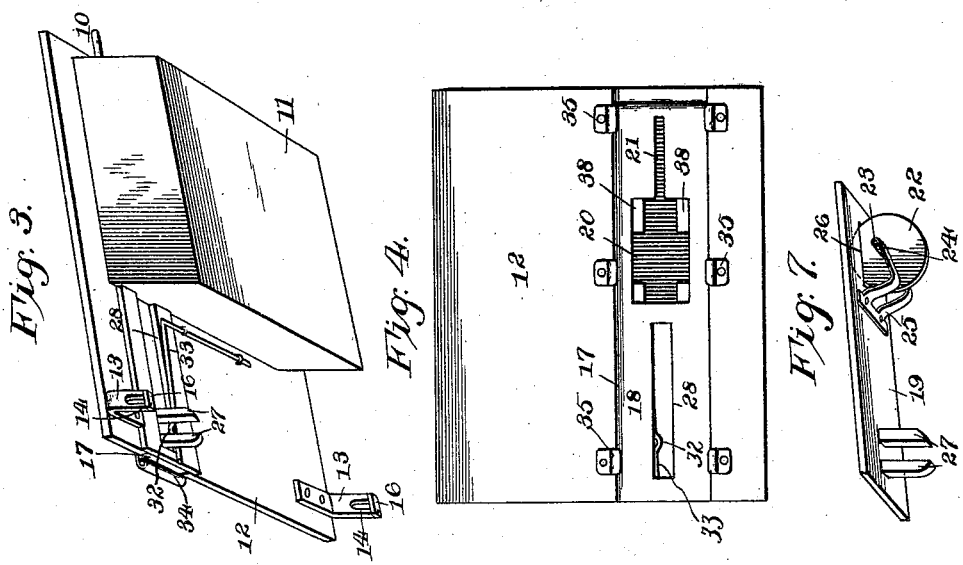
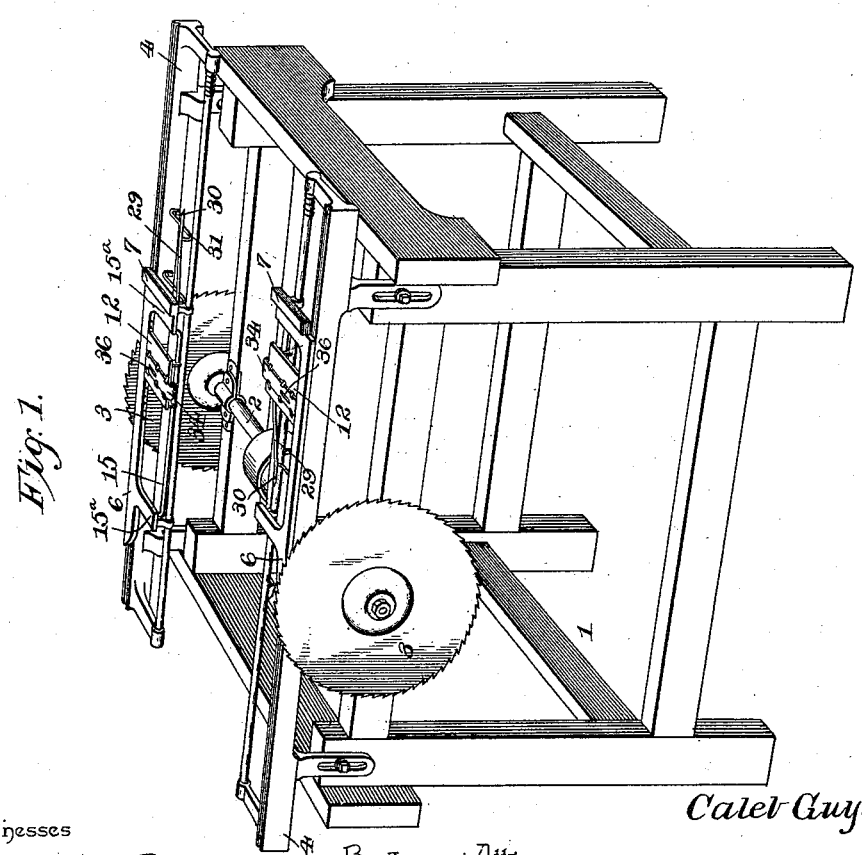
Witnesses
Chas. T. Ford.
[signature]
Inventor
Caleb Guyer,
By his Attorneys.
C. A. Snow & Co.

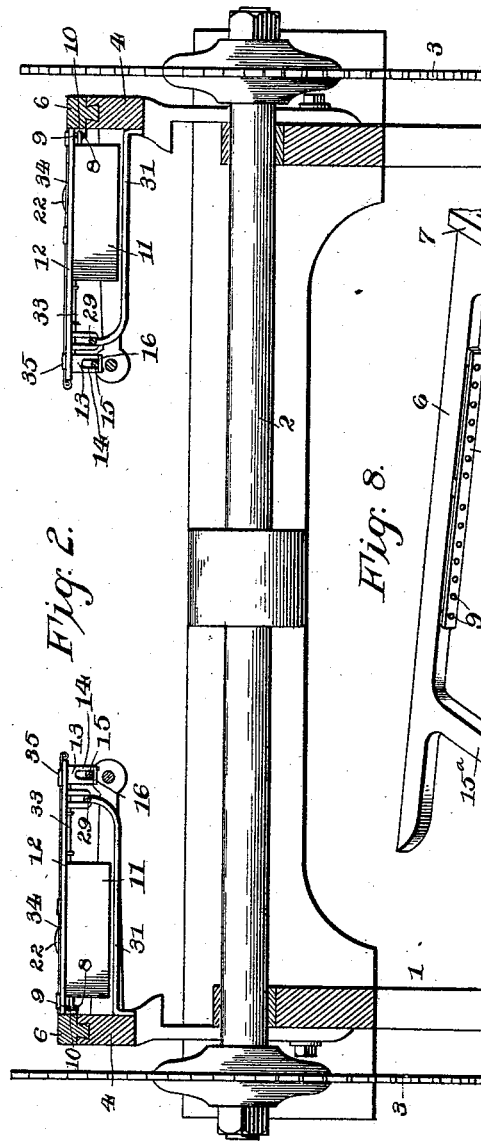

UNITED STATES PATENT OFFICE.

CALEB GUYER, OF TYRONE, PENNSYLVANIA.

SHINGLE-MARKER.

SPECIFICATION forming part of Letters Patent No. 532,661, dated January 15, 1895.

Application filed May 29, 1894. Serial No. 512,911. (No model.)

*To all whom it may concern:*

Be it known that I, CALEB GUYER, a citizen of the United States, residing at Tyrone, in the county of Blair and State of Pennsylvania, have invented a new and useful Shingle-Marker, of which the following is a specification.

This invention relates to shingle markers; and it has for its object to provide new and useful means for placing a transverse mark or line on a shingle that is carried longitudinally onto an edging saw.

To this end the main and primary object of the present invention is to provide a shingle marking device adapted to be used in connection with the feed carriage of a sawing machine, whereby the ordinary gage mark will be placed transversely on the shingle while the same is being fed longitudinally onto the saw by the carriage, and to accomplish this result the invention also contemplates certain improvements wherein the marking attachment shall be especially available for use in connection with the feed carriage of a saw shingle jointer or knot saw machine.

With these and other objects in view, which will readily appear as the nature of the invention is better understood, the same consists in the novel construction, combination, and arrangement of parts hereinafter more fully described, illustrated, and claimed.

In the accompanying drawings:—Figure 1 is a perspective view of a double knot saw machine or side jointer showing the herein-described shingle marker attachment fitted to the feed carriages thereof. Fig. 2 is a central transverse sectional view of such machine showing the attachments properly positioned in connection therewith. Fig. 3 is a detail in perspective of the shingle marking attachment. Fig. 4 is a top plan view thereof with the slide cover removed. Fig. 5 is a central longitudinal sectional view of the shingle marking attachment. Fig. 6 is a transverse sectional view thereof. Fig. 7 is a detail in perspective of the sliding marker plate carrying the marker wheel or disk. Fig. 8 is a detail in perspective of one of the feed carriages of a saw machine with the adjustable part of the attachment removed. Fig. 9 is a similar view of one side of the table frame of the machine showing the attachment of the compoundly curved cam rod thereto.

Referring to the accompanying drawings, 1 designates the supporting frame or stand of an ordinary double knot saw machine. The frame 1 supports thereon the usual transverse saw arbor 2, on both ends of which are mounted the circular edging saws 3, and at opposite sides of the machine frame adjacent to each saw are located the longitudinally disposed slide tables 4, on which are supported to slide the longitudinally reciprocating feed carriages 6, provided at one end with the ordinary rest shoulder 7, against which is placed one end of the shingle that is fitted longitudinally onto the saw for the purpose of being properly edged up.

The above description indicates the general outline of an edging machine of that character in connection with which the herein-described attachment is employed for the purpose of transversely marking the shingles while being fed longitudinally onto the saws, and in order to provide for properly attaching the marking attachment to the feed carriages 6, each carriage is adapted to have secured longitudinally to the inner side thereof the longitudinal adjustment strip or plate 8, that is provided with a longitudinal series of adjustment perforations 9, that are adapted to adjustably receive the engaging studs or pins 10, projected from one side or end of the pigment box 11. The pigment box 11, of the attachment is secured to the under side of the attachment plate 12, that extends beyond all sides of the pigment box. At its inner side next to the saw the attachment plate 12, is adapted to rest on top of the adjustment strip or plate 8, so as to lie flush with the top face of the feed carriage, and said attachment plate 12, has projected from the under side thereof near one edge the depending securing feet 13, having lower slotted ends 14, adapted to embrace the supporting rod 15, that is secured to the inner ends of the inwardly extended end bars 15ª, of the feed carriage, and said lower slotted ends of the feet 13, are held detachably locked to the said rod 15 by means of suitable lock plates or turn buckles 16, pivotally attached to the lower extremities of the said feet 13, and adapted to be turned under the rod 15, to securely lock the attachment in its adjusted position. By the connections described it will be understood that the marking attachment can be adjusted longitudinally of the feed carriage to which it is attached for the purpose of adjusting the marking part of the attachment to the proper point where it is desired to place the mark on the shingle as the same is fed onto the saw.

The attachment plate 12, of the marking attachment is provided with the transverse slide groove 17, extending from side to side thereof and opening directly into the top of the pigment box 11, and the bottom of said slide groove 17, is covered by the bottom plate 18, that forms a support for the sliding marker plate 19 arranged to loosely slide in said transverse slide groove from end to end thereof, and said bottom plate 18, is provided at a point directly over the pigment box 11, and opening thereinto with the widened wheel opening 20, and the wheel guide slot 21, leading off from one end of said opening to accommodate therein the lower portion of the marker wheel or disk 22.

The marker wheel or disk 22, is provided at both sides with the spindles 23, journaled in the bearings 24, at the opposite extremities of the bifurcated spring fork 25, secured to the under side of the marker plate 19, and normally projecting the upper portion of the wheel or disk through the wheel slot 26, formed in the plate 19, near one end thereof, and by this arrangement it will be obvious that the marker wheel or disk 22, works in the pigment or other coloring matter that might be placed in the pigment box, and by the rotation thereof will make the proper mark on the shingle as the same is carried by the carriage onto the saw.

The sliding marker plate is adapted to have a reciprocating movement in the transverse groove 17, from end to end thereof, so as to play transversely under the longitudinally disposed shingle, and at the end opposite the wheel, the said marker plate is provided with the depending parallel shifting arms 27, that project through and are guided in their movement in the guide slot 28, formed longitudinally in the bottom plate 18, beyond one side of the pigment box, and as the feed carriage is moved longitudinally over the slide table of the saw machine, at the proper point, the shifting arms 27 are carried into engagement with the compoundly curved cam rod 29. The compoundly curved cam rod 29, is provided with the straight ends 30, to guide the shifting arms thereover, and is attached to one end of the offstanding bracket arms 31, the other ends of which are secured to a stationary part of the slide table on which the feed carriage slides, so as to dispose the cam rod under the feed carriage. Now it will be obvious that assuming the marker plate to be shifted to one limit of movement in the groove 17, with the marker wheel disposed at one side of the shingle to be marked, the advancement of the feed carriage will carry the arms 27 over one end of the cam rod 29, and these shifting arms will necessarily follow the curvature or cam shape of the stationary rod 29, and will thereby cause the marker plate to be shifted to the opposite end of the groove in which it slides, thus causing the normally projected marker wheel to be carried transversely under the shingle, while the same is being moved longitudinally onto the saw which edges the same. After the advancing feed carriage has passed the stationary cam rod the depending shifting arms 27, are automatically engaged by the catch projection 32, at the free end of the spring catch wire 33, that is secured at its other end to the under side of the attachment plate, and thereby provides means for holding the sliding marker plate at one limit of movement until the returning carriage has again brought the shifting arms onto the cam rod and thereby cause the marker plate to be shifted back again to one end of the slide groove, and in this movement the wheel 22, is guided into the slot 21.

The sliding marker plate 19, is retained in the groove in which it slides by means of a removable slide cover 34, that is adapted to removably inclose the slide groove 17, for the purpose of covering and protecting the working parts of the attachment from dust, &c., and to entirely inclose in the pigment box to prevent any splashing out of the liquid therein. The slide cover 34, is adapted to slide between the opposite parallel series of retaining clips 35, that overlap the side edges of the said cover, but the same may be otherwise suitably arranged on the attachment plate to cover the groove 17, and the said slide cover 34, is provided near one end with the wheel slot 36, through which the wheel 22, is adapted to be projected by the spring fork 25, for the purpose of marking the shingle, and it is to be observed that the length of the said slot 36, is such that only a mark of the proper length can be made on the shingle, inasmuch as in both limits of movement the shifting plate carries the marker wheel beyond both ends of the said slot, and therefore causes the wheel to ride under the slide cover, and therefore to withdraw from out of the slot so that the shingle will only be marked while the feed carriage is being moved longitudinally and during the time the shifting arms of the slide plate are engaged with the stationary cam rod.

The pigment box 11, is arranged so that the liquid pigment or coloring substance will be confined as much as possible, it being noted that the wheel opening 20 and the slot 21, being the only openings communicating with the box, and depending within the pigment box from both sides of the wheel opening 20, are the parallel breaker plates 37. The plates 37, are slit in their lower edges at regularly spaced points, and have the separate slit portions reversely bent out of the plane of the plates to form a series of alternately arranged breaker flanges 38, that leave sufficient space therebetween for the liquid to freely flow into that part of the box where the wheel rotates, and at the same time prevent a too great splashing about of the liquid to obviate the possibility of the same working out of the box.

Now from the above it is thought that the construction, operation and many advantages of the herein-described shingle marker attachment will be readily apparent, and while a pigment box and marker wheel have been described as providing means for making a colored mark on the shingle, it will be understood that the mechanism described will operate efficiently if the marker consisted of a pencil, disk or other device that could be projected through the marker or wheel slots by the spring fork 25, without the use of a liquid pigment, and any changes in the form, proportion and the minor details of construction may be resorted to without departing from the principle or sacrificing any of the advantages of this invention.

Having thus described the invention, what is claimed, and desired to be secured by Letters Patent, is—

1. In a shingle marker, the combination with the feed carriage of a sawing machine; of an attachment plate secured to said feed carriage, a marker mounted on the attachment plate, and means for transversely reciprocating the marker, substantially as set forth.

2. In a shingle marker, a marking device supported for transverse movement on the feed carriage of an edging machine, and means for moving said marker by the movement of said feed carriage, substantially as set forth.

3. In a shingle marker, a marking device adapted to be adjustably attached to the feed carriage of an edging machine, and means for transversely reciprocating said device by the movement of said carriage, substantially as set forth.

4. In a shingle marker, an attachment plate adapted to be adjustably attached to the carriage of an edging machine, a marker supported to reciprocate transversely of said plate, and means for reciprocating said marker by the movement of said carriage, substantially as set forth.

5. In a shingle marker, an attachment plate adapted to be attached to the carriage of an edging machine, a marker plate supported to slide transversely on said plate and carrying a marking device, and a shifting device for said marker plate, substantially as set forth.

6. In a shingle marker, an attachment plate adapted to be adjustably attached to the carriage of an edging machine, a marker plate supported to slide transversely on the attachment plate and carrying a normally spring elevated marker, and a shifting device operated by the movement of said carriage, substantially as set forth.

7. In a shingle marker, the combination of a longitudinally perforated adjustment strip or plate adapted to be fitted to the inner side of the carriage of an edging machine, a longitudinally disposed supporting rod arranged on said carriage opposite said plate, the attaching plate carrying at one side projected engaging studs or pins adapted to adjustably engage the perforations of said strip or plate, and also having near one edge depending slotted securing feet adapted to be detachably locked onto said supporting rod, a transversely reciprocating marking device mounted on said plate, and means for operating said marking device, substantially as set forth.

8. In a shingle marker, an attachment plate adapted to be attached to the carriage of an edging machine and provided with a transverse slide groove, a marker plate arranged to slide in said groove from end to end thereof, a spring elevated marker device attached to said marker plate and carried thereby, and a shifting device for said marker plate and operated by the longitudinal movement of said carriage, substantially as set forth.

9. In a shingle marker, an attachment plate adapted to be attached to the carriage of an edging machine and provided with a transverse slide groove and a bottom plate for said groove having a longitudinally disposed guide slot, a sliding marker plate arranged to slide in said groove and carrying a marking device, said plate being provided with depending shifting arms working in said guide slot, and a compoundly curved cam rod supported from a stationary part of the edging machine below the carriage to be engaged by said shifting arms, substantially as set forth.

10. In a shingle marker, an attachment plate adapted to be attached to the carriage of an edging machine and provided with a transverse slide goove, a sliding marker plate carrying at one end a marking device and arranged to slide in said groove, said plate being provided with depending parallel shifting arms, a compoundly curved cam rod supported from a stationary part of the edging machine below the carriage to be engaged by said shifting arms, and a spring catch wire secured to said attachment plate and having a catch projection adapted to engage the said shifting arms to lock the marker plate in one position, substantially as set forth.

11. In a shingle marker, the combination of an attachment plate adapted to be attached to the carriage of an edging machine and provided with a transverse slide groove, a pigment box arranged at the under side of said plate under the slide groove, a transversely reciprocating sliding marker plate working in said slide groove, a normally spring elevated marker wheel or disk attached to one end of said plate and projecting through a slot therein, means for shifting said marker plate, and a detachable or removable slide cover adapted to inclose said slide groove and provided with a wheel slot shorter in length than the movement of said sliding marker plate, substantially as set forth.

12. In a shingle marker, the combination of the attachment plate having a transverse slide groove, the pigment box arranged at the under side of said plate and over said slide groove, the marker plate arranged to slide in said transverse slide groove and provided near one end with a wheel slot, a bifurcated spring fork attached to the under side of the marker plate near the wheel slot, a marker wheel or disk journaled on the opposite extremities of said spring fork and means for reciprocating the marker plate, substantially as set forth.

13. In a shingle marker, the combination of the attachment plate having a transverse slide groove, the pigment box arranged at the under side of said plate and opening into said groove, the transversely reciprocating marker wheel working in said pigment box, and the parallel breaker plates depending within the pigment box at both sides of the groove of the attachment plate and provided at their lower edges with alternately bent breaker flanges, substantially as set forth.

In testimony that I claim the foregoing as my own I have hereto affixed my signature in the presence of two witnesses.

CALEB GUYER.

Witnesses:
J. H. SIGGERS,
E. G. SIGGERS.